Patented Aug. 5, 1952

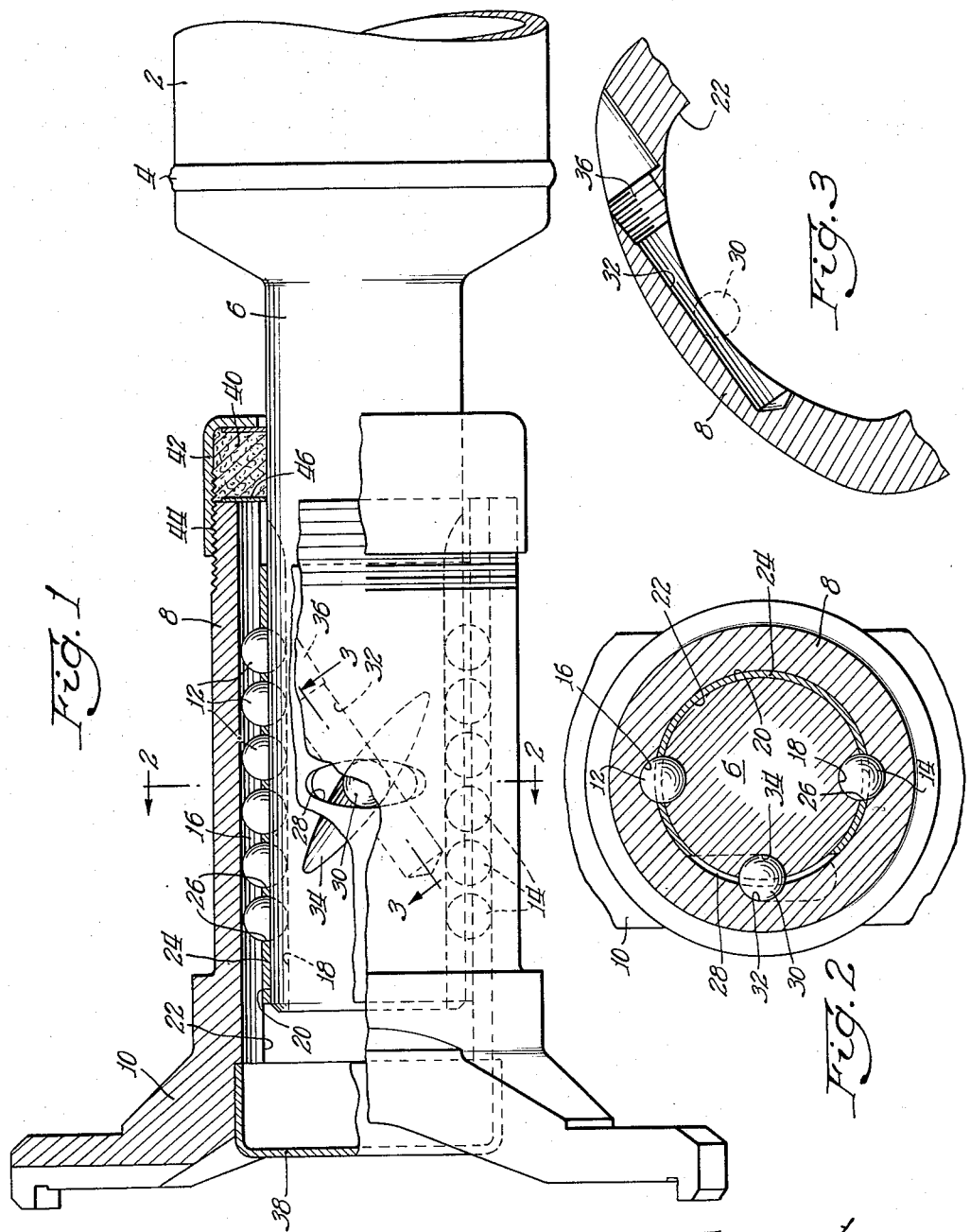

2,605,622

UNITED STATES PATENT OFFICE 2,605,622

SPLINE JOINT

Edmund B. Anderson, Rockford, Ill., assignor to Borg-Warner Corporation, Chicago, Ill., a corporation of Illinois Application May 16, 1946, Serial No. 670,242

6 Claims. (Cl. 64—23)

This invention relates to couplings, and more particularly to a coupling device adapted to interconnect driving and driven shafts or elements.

An object of my invention is to provide a coupling device embodying co-axial driving and driven elements in telescoping relationship and capable of axial movement relative to each other.

Another object of my invention is the provision of a coupling device of the type described wherein the driving and driven elements are interconnected for common rotational movement and relative axial movement by anti-friction members through which the torque is transmitted.

My invention is particularly adapted for connecting driving and driven elements or sections of a propeller or drive shaft assembly of a motor driven vehicle by means of a slip joint to convey power from the motor in smooth flow to the driven wheels while permitting relative longitudinal or axial movement of the elements of the shaft assembly to compensate for variations in the changes in distance between the connection of one of the elements to the transmission and the connection of the other element to the differential due to the action of the car springs. Heretofore, a splined connection between these elements of the assembly has been conventionally used to secure this desirable result which necessitated the accurate machining of a multiplicity of axially extending grooves and splines on each element for insuring snug interfitting of the elements of the assembly for the purpose described. One disadvantage of utilizing a splined connection of the elements for permitting their relative axial movement is that the ensuing sliding frictional engagement of the elements caused wear of the engaged portions of the elements which tended to eventually permit a loose fit or slack between the adjacent sides of the splines and grooves of the elements whereby during initial starting movement of the vehicle by the motor, or by pushing or pulling the vehicle, and consequent rotation of the propeller shaft assembly the inertia of the driven element caused clashing of the elements. Also, during operation of the vehicle, the frequent reversal of torque of one of the elements relative to the other element further resulted in shock to the elements. The clashing or shock in the engagement of the elements under the above circumstances is detrimental to the satisfactory performance of the vehicle as it may cause jerky operation of the vehicle and also imposes strains, not only on the elements with possible breakage of the splines, but also to the running gear connected thereto and damage to the gear. To substantially reduce this wear between the elements of the shaft assembly and thereby the attendant injury to the same and associated operating parts, my novel coupling device utilizes a plurality of anti-friction members, which may be balls, to transmit torque between the elements of the shaft assembly while functioning to permit relative axial movement of the elements. The rolling friction of the anti-friction members during relative axial movement of the elements substantially eliminates the amount of wear between the surfaces of the elements in engagement with the friction members as compared to the case where the two members have splines slidingly frictionally engaged, assuming that the pressure is the same as in the present case.

It is therefore a further object of my invention to provide a coupling device between two coaxially adjustable telescoping torque transmitting parts of a propeller shaft assembly in which the torque is transmitted and axial adjustment provided by means of anti-friction members, such as balls.

My invention contemplates a coupling device as described, wherein the anti-friction members, or balls, are confined within a cage and controlled by another ball disposed in intersecting raceways in the torque-transmitting elements of the assembly. It is known heretofore that the position of anti-friction balls may be controlled broadly by a ball located between and in intersecting raceways in two opposed elements. However, the present invention is believed to be the first application of this arrangement to the control of a cage and anti-friction members located between two coaxially adjustable torque-transmitting elements.

Other objects of the invention will become apparent from the following specification, from the drawings relating thereto, and from the claims hereinafter set forth:

Fig. 1 is a side elevation of the driven and driving members of a propeller assembly embodying the coupling device of the present invention, the outer member being shown partially in section to more clearly illustrate the invention;

Fig. 2 is a transverse section taken on the line 2—2 of Fig. 1; and

Fig. 3 is a fragmentary sectional view of the intersecting raceways in the outer member of the assembly taken along the line 3—3 of Fig. 1.

As an example of one form in which my invention may be embodied, I have shown in the drawings my novel coupling device applied to the propeller shaft assembly of a motor car power transmission. The principal parts of the assembly comprise two sections, one section being shown as the tube 2 welded at 4 to a stub shaft 6 telescoped within the other section shown as a driving sleeve 8 which may be formed integral, if desired, with a yoke 10 of a universal joint. The assembly described is interposed between and connected in the usual manner to the transmission shaft (not shown) and to the differential pinion shaft (not shown), or equivalent shafts, the sleeve 8 being connected by means of the yoke 10 forming a portion of the front universal joint to the transmission shaft and the tube 2 being fitted with a rear universal joint (not shown) connected to the differential pinion shaft. The description of the assembly thus far is well known to those skilled in the art with respect to its position in the power transmission and connection to the transmission and differenial pinion shafts for the purpose of establishig a driving connection between the motor and rear wheels of a vehicle.

The transmission and differential pinion shafts are in normally fixed spaced relation but are relatively movable during the up and down movement of the differential relative to the transmission, as is well known. Due to the consequent changes in distance between the connections of these shafts to the propeller shaft assembly, it is desirable to connect the tube 2 and sleeve 8 of the assembly in a manner which will not only function to transmit the torque from one to the other and thereby drivingly connect the motor and rear wheels of the vehicle, but will simultaneously permit relative axial movement of the tube and sleeve to compensate for the aforesaid changes in distance.

Heretofore, a splined connection between the torque transmitting and axially movable elements of the propeller shaft assembly has been conventionally used for obtaining these desirable results. A connection of this type effects sliding frictional engagement of the two elements of the assembly during relative axial movement thereof. My invention contemplates the transmission of torque between the elements of the assembly by means of balls located in axially extending raceways in the elements which also permit relative axial movement of the elements thereby substituting rolling friction for the sliding friction of the conventional splined connection of the elements and thereby, reducing in comparison, the wear on the elements to a minimum during their relative axial movement.

Describing my novel coupling device in detail, the driving torque is transmitted from the sleeve 8 to the tube stub-shaft 6 by means of balls and raceways interposed between these parts of the propeller shaft assembly. In the form herein illustrated, two groups 12 and 14 of balls are used, said groups of balls being disposed at diametrically opposite sides of the assembly with each group of the six balls being located in opposed axially extending grooves or raceways 16 and 18 in the outer circumferential surface 20 of the shaft 6 and the inner circumferential surface 22 of the sleeve 8, respectively. These grooves are parallel one with the other and also with the axis of the sleeve 8 and shaft 6 and are preferably disposed in a plane intersecting said axis. The balls are maintained in spaced relation to each other in the associated grooves 14 and 16 by means of the ball guide sleeve or cage 24 positioned between the sleeve 8 and shaft 10, said cage 20 having openings 26 therethrough receiving said balls. It will be apparent from the foregoing that the balls of the groups 10 and 12, by virtue of their engagement in the opposed raceways of the sleeve 8 and the shaft 6, will serve to transmit driving torque from the sleeve 8 to the shaft 10 of the tube 2 and vice versa. Also, when the limited relative axial movement of the sleeve 8 and shaft 10 occurs, the balls have free rolling action in the raceways to accommodate this movement. During this limited axial movement of the propeller sleeve 8 and shaft 10 of the propeller tube 12 relative to each other, the groups of balls and their cage will also travel axially of the assembly. It may be noted that raceways or grooves 16 in the surface 20 of the sleeve 8 extend from end to end thereof and the groove 14 in the surface 20 of the shaft 6 terminates at the left end thereof, an arrangement which is desirable for purposes of assembly. It will be apparent that, during relative axial movement of the sleeve 8 and shaft 6, if the movement of the cage and the group of balls movable therewith were not controlled, the balls could be dislocated from the cage and their engagement with the opposed grooves by failure of one of the associated grooves 14 and 16 to remain in engaged relation with the balls, for example if the shaft 6 be moved to the right relative to the sleeve 8 the balls and cage would tend to travel therewith but at a lesser rate so that the grooves 18 of the shaft 6 would be disengaged from the balls at the left of the cage whereby these balls would be dislocated from the cage and the grooves 16 in the sleeve 8.

To control the axial movement of the cage and the balls in conjunction with the movement of the shaft 6 and sleeve 8 to maintain the balls in their associated grooves 14 and 16 of the latter members, I have provided controlling means in the form of an elongate opening 28 in the annular cage 24, extending between the groups of openings 26 therein, for receiving a ball 30 disposed in, and engaging the angularly related surfaces of, an intersecting pair of raceways 32 and 34 in the sleeve 8 and the shaft 6, respectively. It will be observed from a consideration of Fig. 1 that in the normal horizontal position of the sleeve 8 and tube 2, the ball 30 is located midway between the ends of the opening 28 in the cage 24 and is similarly situated wtih respect to the ends of the raceways 32 and 34 which raceways thereby intersect at a common point centrally of the opening 28 in the cage. Upon the relative axial movement of the sleeve 8 and the shaft 6, the position of the ball in the opening 28 in the cage 24 will be controlled by the raceways 32 and 34 in the shaft 6 and sleeve 8, respectively, and it will be apparent that, upon axial movement of the shaft 6 relative to the sleeve 8, the ball will be bodily moved or displaced relative to the shaft 6 and sleeve 8 and will be forced to travel in a direction angularly or transverse to the direction of relative axial movement of the shaft 6 or sleeve 8, i. e., from end to end of the opening 28 in the cage 24, in accord with the changing point of intersection of the raceways 32 and 34 with the opening in the cage whereby the cage and groups 12 and 14 of the torque-transmitting balls will move in the same direction as the shaft 6 moves relative to the sleeve 8, but approximately one-half the distance that the shaft 6 will be moved. This controlled movement of the balls insures the location of the balls in a substantially central position between the ends of the assembly irrespective of the relative axial movement of the sleeve 8 and tube 2 whereby torque transmitted by the balls from one to the other of these members of the assembly will be most efficiently distributed and stresses minimized. It will be noted that the arrangement described for controlling the travel of the cage 24 and the balls movable therewith will at all times maintain the balls in the associated grooves in the sleeve 8 and shaft 6 during the relative axial movement of these parts of the propeller assembly shaft. It may be noted from a consideration of Fig. 3 that the ball 30 may be inserted in a cutout portion 36 in the sleeve 8 which in conjunction with the raceway 32 makes it possible to insert the ball 30 into the opening 28 in the cage 24 and raceway 34 in the shaft 6 for assembly purposes.

For the purpose of excluding dirt and other extraneous matter, the yoke end of the sleeve 8 may be closed by a closure member 38 that is inserted into the sleeve 8 and anchored thereto. In order to prevent the passage of lubricant between the slidingly telescoped portions 6 and 8 of the assembly, a seal ring 40 surrounds the shaft 6 and is maintained in position by means of an annular retainer 42 threaded at 44 to the sleeve 8. It may be noted that a washer 46 abuts the end of the sleeve 8 for the purpose of providing a stop engageable with the adjacent end of the cage 24 upon axial movement of the sleeve 24 toward the threaded end of the sleeve 8.

It may be noted from the foregoing discussion of the arrangement for controlling the movement of the cage and the balls that the ball 30 will act to limit the relative axial movement of the sleeve 8 and the shaft 6 upon the limit of its travel to one end or the other of the opening 28 in the sleeve 20 in the cage 24 to thereby prevent accidental disassembly of the sleeve 8 and the shaft 6 during operation of the propeller shaft assembly.

In the assembly of driving and driven members 2 and 8 of the propeller shaft, the cage 24 is inserted within the sleeve 8 and the two groups 12 and 14 of balls are inserted within the openings in the cage and into the grooves 16, 16 of the sleeve, whereupon the shaft 6 of the tube 2 may be inserted within the sleeve 8 with each groove 14 in alignment with a group of the balls for reception therein. The sleeve 8, shaft 6 and cage 2 are moved axially relative to each other until the crossed raceways in the sleeve 8 and shaft 6 are positioned with respect to the opening 28 in the cage as shown in Fig. 1 and as may be observed through the outer end of the opening 36 in the sleeve, whereupon the ball 30 may be inserted within the opening 36 for location in its operative position.

The invention may be embodied in other specific forms without departing from the essential characteristics thereof. Therefore, the present embodiment is to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

I claim:

1. A drive shaft assembly comprising two coaxially adjustable torque-transmitting members in telescoping relationship, a pair of opposed raceways in said members in each of the diametrically opposite sides thereof and extending parallel to the axis of rotation of said assembly, a plurality of balls in each pair of opposed raceways and connecting said members in driving relation while permitting relative axial movement thereof, an axially movable cage for said balls and disposed between said members, said cage having an elongate opening extending between the pairs of raceways, a pair of complementary opposed ball raceway grooves in said members in crossed relation and intersecting said opening, and a ball in said opening and said grooves at the intersection thereof.

2. A drive shaft assembly comprising two coaxially adjustable torque-transmitting members in telescoping relationship, said members having their adjacent surfaces provided with pairs of spaced axially extending complementary grooves, a plurality of anti-friction elements in each pair of grooves and drivingly connecting said members while permitting relative axial movement thereof, a retaining member for said elements and located between said members and having a slot therethrough and extending between said pairs of grooves, and a pair of grooves in said surfaces in crossed relation and intersecting said opening, and a ball within said opening and said last-mentioned pair of grooves at their intersection for controlling the axial movement of said retaining member and thereby said elements during relative axial movement of said members.

3. A drive shaft assembly comprising telescoping coaxially adjustable members, sets of complementary raceways in the adjacent surfaces of said members extending parallel to the axis of said assembly at opposite sides thereof, balls interposed between the raceways of each set for connecting said members in driving and coaxially adjustable relation, a retaining member for said balls and located between said first-mentioned members, diagonal raceways in said surfaces in crossed relation and intersecting an elongate opening in said retaining member, and a ball disposed in said opening and said diagonal raceways.

4. A drive shaft assembly comprising telescoping coaxially adjustable driving and driven members, pairs of opposed raceways in said members extending in an axial direction, drive-transmitting balls in said raceways, a sleeve between said members and having openings receiving said balls, intersecting grooves in said members angularly disposed with respect to said pairs of raceways and positioned therebetween, said sleeve having a slot therethrough, extending between said pairs of raceways, and crossing said grooves, and a ball within said slot and said grooves.

5. A rotatable drive shaft assembly comprising telescoping coaxially adjustable torque-transmitting members having opposed raceways extending longitudinally of said assembly and also having angularly related surfaces in spaced relation to said raceways; a plurality of anti-friction elements in said raceways affording a driving connection between said members while permitting relative axial movement thereof; a retaining member for said anti-friction elements; and means bearing against said angularly related surfaces and said retaining member for moving said retaining member and said anti-friction elements during coaxial adjustment of one of said torque-transmitting members relative to the other torque-transmitting member.

6. A rotatable drive shaft assembly comprising telescoping coaxially adjustable torque-transmiting members having opposed raceways extending longitudinally of said assembly and also having angularly related surfaces in spaced relation to said raceways; a plurality of anti-friction elements in said raceways affording a driving connection between said members while permitting relative axial movement thereof; a retaining member for said anti-friction elements; and means bearing against said angularly related surfaces and said retaining member for moving said retaining member and said anti-friction elements during coaxial adjustment of one of said torque-transmitting members relative to the other torque-transmitting member, said means being bodily displaced by said angularly related surfaces of said torque-transmitting members and with respect to said torque-transmitting members during relative movement of said torque-transmitting members.

EDMUND B. ANDERSON.

REFERENCES CITED

The following references are of record in the file of this patent:

UNITED STATES PATENTS

| Number | Name | Date |
| --- | --- | --- |
| 754,066 | Hoffman | Mar. 8, 1904 |
| 1,270,533 | Lombard | June 25, 1918 |
| 2,225,929 | Sarazin | Dec. 24, 1940 |
| 2,267,239 | Johnson | Dec. 23, 1941 |